(12) United States Patent
Blanchard et al.

(10) Patent No.: US 11,167,613 B2
(45) Date of Patent: Nov. 9, 2021

(54) SUSPENSION THRUST BEARING DEVICE AND SUSPENSION STRUT EQUIPED WITH SUCH A DEVICE

(71) Applicant: Aktiebolaget SKF, Gothenburg (SE)

(72) Inventors: Xavier Blanchard, Saint-Cyr-sur-Loire (FR); Thomas Lepine, Tours (FR); Bruno Montboeuf, Saint-Cyr-sur-Loire (FR); Jordan Renaudon, Tours (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/015,709

(22) Filed: Sep. 9, 2020

(65) Prior Publication Data

US 2021/0107327 A1    Apr. 15, 2021

(30) Foreign Application Priority Data

Oct. 10, 2019   (DE) .......................... 102019215539.1

(51) Int. Cl.
| | |
|---|---|
| *B60G 15/06* | (2006.01) |
| *F16C 33/58* | (2006.01) |
| *F16C 19/10* | (2006.01) |
| *F16C 27/08* | (2006.01) |

(52) U.S. Cl.
CPC ............ *B60G 15/068* (2013.01); *F16C 19/10* (2013.01); *F16C 27/08* (2013.01); *F16C 33/583* (2013.01); *B60G 2204/128* (2013.01); *B60G 2204/418* (2013.01); *B60G 2204/45021* (2013.01); *F16C 2326/05* (2013.01)

(58) Field of Classification Search
CPC .......... F16C 19/10; F16C 19/16; F16C 27/08; F16C 33/583; F16C 2326/05; B60G 15/067; B60G 15/068; B60G 2204/128; B60G 2204/518; B60G 2204/45021; B60G 2204/418
See application file for complete search history.

(56) References Cited

U.S. PATENT DOCUMENTS

| | | | |
|---|---|---|---|
| 8,496,383 B2* | 7/2013 | Viault | F16C 19/10 384/617 |
| 2008/0031562 A1* | 2/2008 | Poulle | F16F 9/54 384/618 |
| 2010/0014792 A1* | 1/2010 | Kellam | B60G 15/067 384/196 |

(Continued)

*Primary Examiner* — Alan B Waits
(74) *Attorney, Agent, or Firm* — Garcia-Zamor Intellectual Property Law; Ruy Garcia-Zamor; Bryan Peckjian

(57) ABSTRACT

A suspension thrust bearing device for use with a suspension spring in an automotive suspension strut of a vehicle. The device provides a bearing having upper and lower annular bearing members in relative rotation, and a damping element made of resilient material and interposed between the lower annular bearing member and the suspension spring. The damping element including at least one deflecting flange for reducing any ingress of water and other pollutants between the upper and lower annular bearing members. The damping element is provided with an annular groove open axially towards the suspension spring, the annular groove radially defining a spring support surface on an inner side, and the deflecting flange on an outer side. The deflecting flange has a frustoconical shape directed axially towards the suspension spring.

7 Claims, 2 Drawing Sheets

(56) References Cited

U.S. PATENT DOCUMENTS

| | | | | |
|---|---|---|---|---|
| 2011/0291337 A1* | 12/2011 | Viault | ............ | B60G 15/068 |
| | | | | 267/220 |
| 2012/0020606 A1* | 1/2012 | Montboeuf | ......... | F16C 33/7893 |
| | | | | 384/607 |
| 2017/0261032 A1* | 9/2017 | Lepine | ............ | F16C 19/12 |
| 2018/0372152 A1* | 12/2018 | Gaultier | ............ | F16C 19/10 |
| 2020/0189344 A1* | 6/2020 | De Lemps | ............ | B60G 15/02 |
| 2020/0231015 A1* | 7/2020 | Blanchard | ............ | B60G 15/067 |
| 2020/0240465 A1* | 7/2020 | Blanchard | ............ | F16C 17/045 |
| 2021/0172478 A1* | 6/2021 | Yan | ............ | F16C 33/80 |

* cited by examiner

SUSPENSION THRUST BEARING DEVICE AND SUSPENSION STRUT EQUIPED WITH SUCH A DEVICE

CROSS-REFERENCE TO RELATED APPLICATIONS

This application claims priority to German Patent Application no. 102019215539.1, filed Oct. 10, 2019, the contents of which is fully incorporated herein by reference.

TECHNICAL FIELD OF THE INVENTION

The present invention relates to a suspension thrust bearing device, in particular of the MacPherson type ("MacPherson Suspension Bearing Unit" or MSBU). The invention also relates to a strut for a motor vehicle, comprising a damper and such a suspension thrust bearing device. The field of the invention is that of suspension systems, notably motor-vehicle suspension systems.

BACKGROUND OF THE INVENTION

In a known manner, a motor vehicle suspension system comprises a suspension strut supporting an axle and a vehicle wheel. A suspension thrust bearing device is disposed in an upper portion of the suspension strut, opposite to the wheel and the ground, and between a suspension spring and an upper support block attached to the vehicle chassis.

The suspension thrust bearing device includes at least one bearing, for example a rolling bearing, comprising upper and lower annular bearing members in relative rotation around a main axis.

The suspension thrust bearing device enables transmission of axial forces between the spring and the body of the vehicle and, in the meantime, allows relative angular movement between the spring, which is mobile in rotation, and the fixed support block attached to the body.

The damping function of the suspension thrust bearing device can be improved by the use of a damping element made of resilient material and mounted between the lower cup and the suspension spring.

Such a suspension thrust bearing device, notably of the MSBU type, is required to be used in an aggressive environment. The vehicle is for example likely to run on a flooded, dusty or muddy road and then be cleaned with a high-pressure cater jet. In these conditions, ingress of water or of other polluting particles may occur in the strut, notably in the bearing, with harmful consequences to their service life and their respective performances.

In this respect, it is known from document US 2008/0031562 A1 to provide a deflecting flange extending substantially radially from a damping element, the flange being designed to form a flow deflector for reducing any ingress of water and other pollutants inside the suspension thrust bearing device.

However, the axial load of suspension spring onto the damping element may induce axial and radial deformations of the element. More particularly, it has been observed that the deflecting flange upwardly move towards the upper cup. This undesired flange displacement leads to contacts with the upper cup, and then an increase of suspension thrust bearing device torque and negative impact on device performances. The deflecting flange and the upper cup may be worn and have a reduced service life. It also leads to an extra noise which must be prohibited. The deflecting flange may also downwardly move towards the lower side of the suspension strut, inducing a loss of sealing performance.

SUMMARY OF THE INVENTION

The aim of the invention is to overcome these drawbacks by proposing an enhanced suspension thrust bearing device. It is desirable to provide a suspension thrust bearing device which is relatively inexpensive, has a good operational reliability, and has an increased service life.

To this end, the invention relates to a suspension thrust bearing device, for use with a suspension spring in an automotive suspension strut of a vehicle.

The suspension thrust bearing device comprises a bearing having upper and lower annular bearing members in relative rotation.

The suspension thrust bearing device further comprises a damping element made of resilient material and having a radial portion interposed between the lower annular bearing member and the suspension spring. The damping element further comprises at least one deflecting flange that outwardly and substantially radially extends from radial portion for reducing any ingress of water and other pollutants between the upper and lower annular bearing members.

According to the invention, the radial portion of damping element has a material axial thickness $L1$; upper side of radial flange of damping element is provided with an upper annular groove, the annular groove receiving an protruding portion that axially downwardly extends from lower annular bearing member, damping element having a material axial thickness $L2$ at the level of the annular groove; and lower side of the damping element is provided with a lower annular groove open axially towards the suspension spring, the annular groove radially defines a spring support surface on inner side, and the deflecting flange on outer side, damping element having a material axial thickness $L3$ defined between the lower annular groove and the lower annular bearing member, and a material radial thickness $L4$ defined between the lower annular groove and the upper annular groove.

The damping element is such that the ratio between $L2$ and $L1$ is strictly lower than 1; the ratio between $L3$ and $L1$ is strictly lower than 1; and the ratio between $L4$ and $L1$ is lower than or equal to 1.

According to further aspects of the invention which are advantageous but not compulsory, such a suspension thrust bearing device may incorporate one or several of the following features:

The suspension thrust bearing device comprises a bearing with a first ring fixed to an upper cap, so as to form the upper annular bearing member of the suspension thrust bearing, and a second ring fixed to a lower cap, so as to form the lower annular bearing member of the suspension thrust bearing.

The first and second rings are made from a stamped metal sheet.

The upper and lower caps are made from a rigid plastic material.

The upper and/or lower caps may comprise stiffening insert.

The upper and/or lower caps are overmolded onto a stiffening insert.

The bearing is a rolling bearing, the first and second rings defining an annular rolling chamber between them and at least one row of rolling elements being disposed within the rolling chamber.

The rolling elements are balls.

The deflecting flange has a frustoconical shape directed axially towards the suspension spring.

Deflecting flange is provided with a shoulder in radial abutment against a front surface of lower annular bearing member.

Shoulder is annular.

The ratio between L4 and L2 is lower than or equal to 1.

The damping element is directly molded on the lower annular bearing member.

The damping element comprises rubber thermoplastic elastomer (TPE), in particular thermoplastic polyurethane (TPU), melt processible elastomer (MPE) or elastomer cellular foam.

The invention also relates to a motor vehicle suspension strut comprising a damper rod, a suspension spring, and a suspension thrust bearing device as mentioned above.

BRIEF DESCRIPTION OF THE DRAWINGS

The invention will now be explained in correspondence with the annexed figures, as an illustrative example, without restricting the object of the invention. In the annexed figures.

DETAILED DESCRIPTION OF SOME EMBODIMENTS

Figure 1:
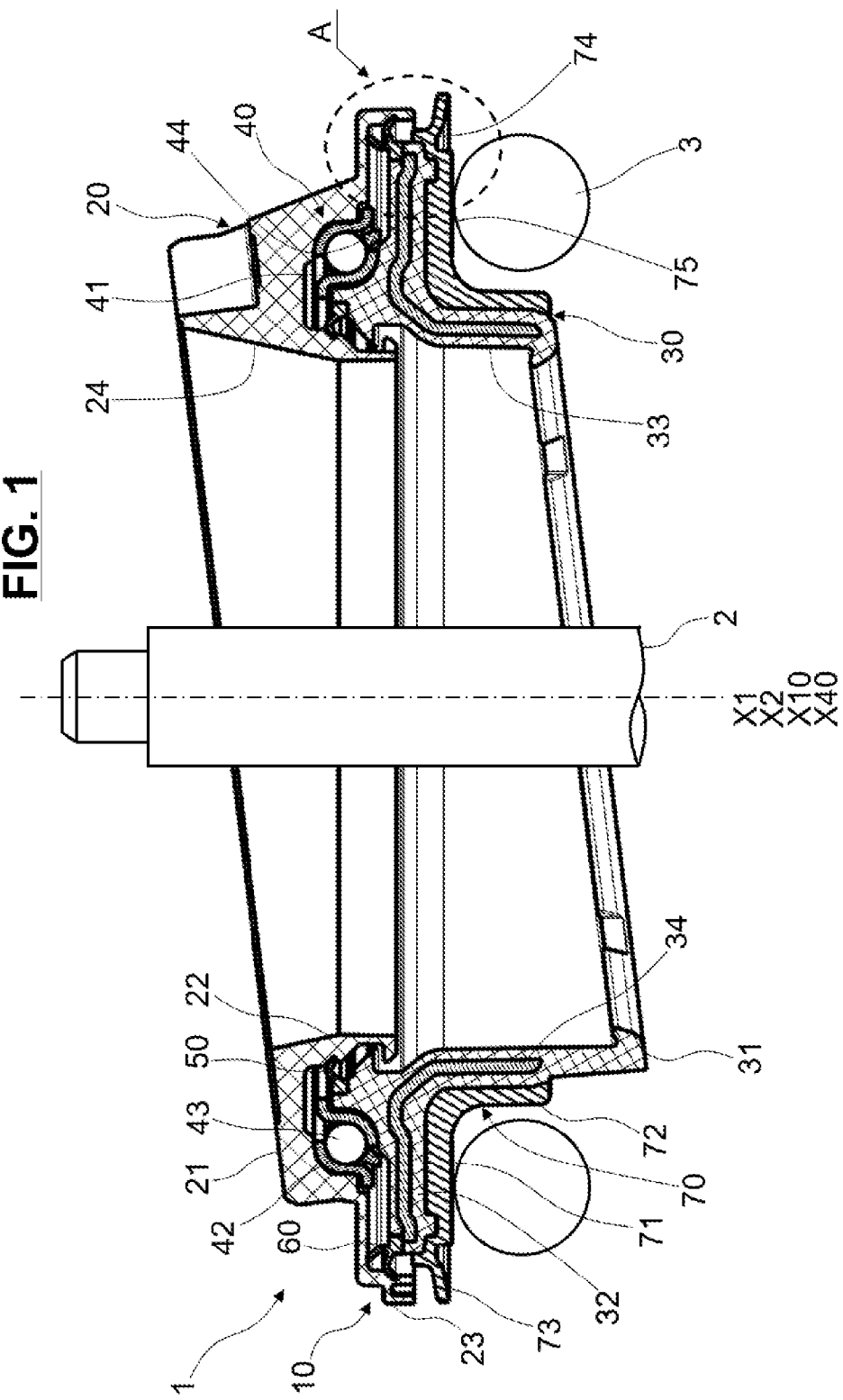
FIG. 1 is a sectional view of a suspension strut according to a first embodiment of the invention, comprising a suspension thrust bearing unit also according to a first embodiment of the invention, and a damper rod and a suspension spring.
Figure 2:
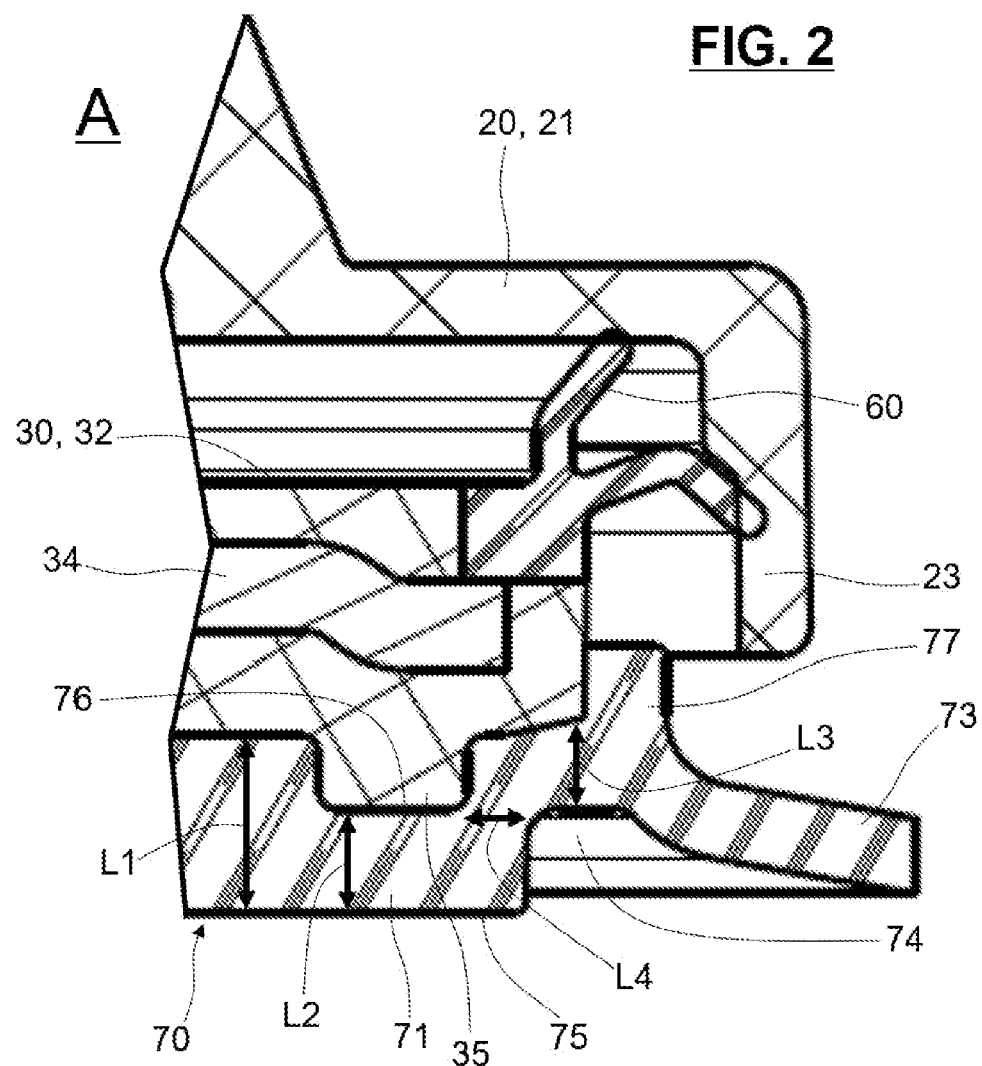
FIG. 2 is a detailed sectional view of the suspension thrust bearing device of FIG. 1.

A suspension strut 1, partially shown in FIG. 1, is incorporated into a motor-vehicle suspension system. The suspension strut 1 supports a vehicle axle and wheel which are not shown for the purposes of simplification. The suspension strut 1 extends along a main axis X1, placed in substantially vertical direction when the wheel of the vehicle rests on flat ground. The suspension strut 1 comprises a damper piston including a piston body and a damper rod 2 of axis X2, a coil suspension spring 3 and a suspension thrust bearing device 10. The rod 2 and the spring 3 are partially shown in FIG. 1, while the piston body is not shown for the purposes of simplification.

The suspension thrust bearing device 10 with main axis X10 is mounted between the spring 3 and a support block (not shown) connected to the chassis of a motor vehicle. The axis X2 and X10 coincide with the main axis X1 when the suspension system of the vehicle is at rest, as illustrated in FIG. 1.

Hereinafter, the adjectives "axial" and "radial" are defined relative to the main axis X10 of the annular thrust bearing device 10.

The suspension thrust bearing device 10 comprises an upper cap 20, a lower cap 30 and a single rolling bearing 40. In this embodiment, these three components 20, 30 and 40 are of globally circular shape about a main axis X40 coinciding with the main axis X10 when the suspension system of the vehicle is at rest.

The upper cap 20 consists in a one-piece part made from plastic synthetic material, for example from polyamide, optionally reinforced with glass fibers. The upper cap 20 has a radially-extending flange 21, an inner axially-extending hub 22 of relatively small diameter and extending towards the lower side of the suspension thrust bearing device 10, and an outer axially-extending skirt 23 of relatively large diameter and extending towards the lower side of the suspension thrust bearing device 10. The inner hub 22 defines an inner bore 24 for the suspension thrust bearing device 10 wherein the damper rod 2 is mounted.

The upper cap 20 is dedicated to be fixed to a support block of the automotive vehicle chassis.

The rolling bearing 40 comprises a pressed sheet metal inner race 41, an outer race 42 also of pressed sheet metal, a row of rolling elements 43, here balls, and a cage 44 for maintaining a regular circumferential spacing between the rolling elements 43. The rolling elements 43 are disposed in a rolling chamber defined between raceways formed by toroidal portions of the inner race 41 and outer race 42.

As an alternative not shown, no rolling elements need to be used but rather the inner and outer races may directly contact each other, with a suitable low friction material, coating, or lubricant being used.

The rolling bearing 40 is integrally radially located between the inner hub 22 and the outer skirt 23 of the upper cap 20. The inner race 41 is fitted within a toroidal inner portion of the lower cap 30. The inner race 41 and the lower cap 30 form a lower annular bearing member. The outer race 42 is fitted onto a toroidal outer portion provided on the lower side of flange 21 of the upper cap 20. The outer race 42 and the upper cap 20 form an upper annular bearing member. The upper and lower annular bearing members are in relative rotation with respect to the axis X40.

The lower cap 30 comprises an axially-extending hub 31 defining an inner bore 33 wherein the rod 2 axially extends. The lower cap 30 further comprises a radial flange 32 that radially outwardly extends 4 from the hub 31. The toroidal outer portion supporting the inner race 41 of the rolling bearing 40 is provided on an upper surface of the radial flange 32.

The lower cap 30 comprises a stiffening insert 34 extending along the hub 31 and the flange 32 so as to support the load and the shocks exerted by the spring 3. The stiffening insert may be in metal or in a rigid plastic. As an alternative not shown, the upper cap 20 may also comprise a stiffening insert.

Inner sealing means 50 are provided between an inner periphery of the radial flange 32 of the lower cap 30 and the inner hub 22 of the upper cap 20. Outer sealing means 60 are provided between an outer periphery of the radial flange 32 of the lower cap 30 and the outer skirt 23 of the upper cap 20.

The lower cap 30 is further provided with a damping element 70 made from a resilient material so as to enable vibrations to be filtered.

The damping element 70 comprises a radial portion 71 and a tubular axial portion 72. The radial portion 71 is tightly fastened to the lower side of the radial flange 32 of the lower cap 30. The radial portion 71 comprises a lower radial side for receiving an end turn of the suspension spring 3 in bearing contact. The radial portion 71 of the damping element 70 supports axial load and shocks from the suspension spring 3.

The tubular axial portion 72 axially extends from the radial portion 71 towards the lower side of the suspension thrust bearing device 10. The tubular axial portion 72 is tightly fastened to an outer cylindrical surface of the hub 31 of the lower cap 30. The tubular axial portion 72 of the damping element 70 supports radial load and shocks from the suspension spring 2.

The tubular axial portion 72 and radial portion 71 of the damping element 70 are connected together so as to cover the exterior surface of the axial hub 31 and the radial flange 32 of the lower cap 30.

The damping element 70 is made from a resilient material, such as rubber thermoplastic elastomer (TPE), in particular thermoplastic polyurethane (TPU), melt processible elastomer (MPE) or elastomer cellular foam.

The damping element 70 is advantageously overmoulded onto the lower cap 30. Alternatively, the damping element 70 is fixed to the lower cap 30 by any suitable fixing means, such as glue.

The damping element 70 further comprises a deflecting flange 73 to prevent any ingress of water and pollutant inside the device 10, and more particularly the bearing 40. The deflecting flange 73 extends the radial portion 71 radially outwards, starting from a large diameter edge. The deflecting flange 73 extends radially outwards beyond the large diameter edge of radial flange 32 of lower cap 30. Advantageously, the deflecting flange 73 extends radially outwards at least at the same diameter as the outer skirt 23 of outer cap 20.

According an advantageous embodiment of the invention, the deflecting flange 73 has a frustoconical shape directed axially towards lower side of device 10.

The damping element 70 and the deflecting flange 73 are formed integral, the deflecting flange being advantageously molded.

Lower side of the damping element 70 is further provided with a lower annular groove 74 open axially towards the suspension spring 3. More precisely, the lower side of the radial portion 71 extended by the deflecting flange 73 is provided with the annular groove 74.

The lower annular groove 74 radially defines a spring support surface 75 on inner side, and the deflecting flange 73 on outer side. In other words, the annular groove 74 radially disconnects the deflecting flange 73 from the surface 75 against which the suspension spring 3 exerts an axial load. These two functions ensured by the damping element 70 are then distinct from each other. The annular groove may be of conical shape, of rounded shape, or of any other suitable shape.

The lower surface of radial flange 32 of lower cap 30 is provided with an axially protruding portion 35 directed towards the lower side of device 10. The upper surface of radial portion 71 of damping element 70 is provided with an upper annular groove 76 open to upper side of device 10, and that receives the axially protruding portion 35.

Advantageously, the portion 35 and the groove 76 are of corresponding shapes. Advantageously, the groove 76 is formed during the molding operation of radial portion 71 onto the portion 35 of lower cap 30.

The radial portion 71 of damping element 70 has a material axial thickness $L1$. The damping element 70 has a material axial thickness $L2$ at the level of upper annular groove 76. The damping element has a material axial thickness $L3$ defined between the lower annular groove 74 and the lower annular bearing member 32, and a material radial thickness $L4$ defined between the lower annular groove 74 and the upper annular groove 76.

The damping element is such that the ratio between $L2$ and $L1$ is strictly lower than 1; the ratio between $L3$ and $L1$ is strictly lower than 1; and the ratio between $L4$ and $L1$ is lower than or equal to 1.

According to an advantageous embodiment of the invention, the ratio between $L4$ and $L2$ is lower than or equal to 1.

According to another advantageous embodiment of the invention, the deflecting flange 73 is provided with a shoulder 77 in radial abutment against a front surface of radial flange 32 of lower cap 30.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provided improved cam follower roller device.

Moreover, various features of the above-described representative examples, as well as the various independent and dependant claims below, may be combined in ways that are not specifically and explicitly enumerated in order to provide additional useful embodiments of the present teachings.

The invention claimed is:

1. A suspension thrust bearing device for use with a suspension spring in an automotive suspension strut of a vehicle, comprising:
   a bearing having an upper annular bearing member and a lower annular bearing member in relative rotation to each other, and
   a damping element made of resilient material and having a radial portion interposed between the lower annular bearing member and the suspension spring, the damping element further comprising at least one deflecting flange that outwardly and substantially radially extends from the radial portion for reducing any ingress of water and other pollutants between the upper and lower annular bearing members; wherein
   the radial portion of the damping element has a material axial thickness $L1$; the upper side of the radial flange of the damping element is provided with an upper annular groove, the annular groove receiving a protruding portion that axially downwardly extends from the lower annular bearing member, the damping element having a material axial thickness $L2$ at the level of the annular groove; and a lower side of the damping element is provided with a lower annular groove open axially towards the suspension spring, the lower annular groove defining a spring support surface radially inward of the groove, and the deflecting flange is radially outward of the groove, the damping element having a material axial thickness $L3$ defined between the lower annular groove and the lower annular bearing member, and a material radial thickness $L4$ defined between the lower annular groove and the upper annular groove; and wherein
   the damping element being such that the ratio between $L2$ and $L1$ is less than 1; the ratio between $L3$ and $L1$ is less than 1; and the ratio between $L4$ and $L1$ is lower than or equal to 1.

2. The suspension thrust bearing device according to claim 1, wherein the suspension thrust bearing device comprises the bearing with a first ring fixed to an upper cap, so as to form the upper annular bearing member of the suspension thrust bearing, and a second ring fixed to a lower cap, so as to form the lower annular bearing member of the suspension thrust bearing.

3. The suspension thrust bearing device according to claim 2, wherein the bearing is a rolling bearing, the first and second rings defining an annular rolling chamber between the first and second rings and at least one row of rolling elements being disposed within the rolling chamber.

4. The suspension thrust bearing device according to claim 1, wherein the deflecting flange has a frustoconical shape directed axially towards the suspension spring.

5. The suspension thrust bearing device according to claim 1, wherein the ratio between L4 and L2 is less than or equal to 1.

6. The suspension thrust bearing device according to claim 1, wherein the deflecting flange is provided with a shoulder in radial abutment against a front surface of the lower annular bearing member.

7. A motor vehicle suspension strut comprising a damper rod, a suspension spring, and a suspension thrust bearing device according to claim 1.

* * * * *